:::{}
United States Patent [19]
Harley et al.

[11] Patent Number: 6,091,813
[45] Date of Patent: Jul. 18, 2000
:::

[54] ACOUSTIC ECHO CANCELLER

[75] Inventors: Thomas Harley, Columbia, Md.; Stephen Leese, St. Albans, United Kingdom

[73] Assignee: Noise Cancellation Technologies, Inc., Linthicum, Md.

[21] Appl. No.: 09/102,848

[22] Filed: Jun. 23, 1998

[51] Int. Cl.[7] ............................. H04M 9/08; H04B 3/20
[52] U.S. Cl. ........................... 379/406; 379/410; 379/411; 381/71.1
[58] Field of Search ...................... 379/406, 407, 379/408, 409, 410, 411, 420; 708/322; 370/286, 290, 291; 381/71.1, 71.11, 71.12, 94.1

[56] References Cited

U.S. PATENT DOCUMENTS

| | | | |
|---|---|---|---|
| 5,278,900 | 1/1994 | Van Gerwen et al. | 379/410 |
| 5,305,307 | 4/1994 | Chu | 379/406 |
| 5,315,585 | 5/1994 | Iizuka et al. | 379/410 |
| 5,526,426 | 6/1996 | McLaughlin | 379/411 |
| 5,561,668 | 10/1996 | Genter | 379/409 |
| 5,577,116 | 11/1996 | Townsend et al. | 379/410 |
| 5,768,473 | 6/1998 | Eatwell et al. | 381/94.1 |
| 5,848,151 | 12/1998 | Boudy et al. | 379/410 |

*Primary Examiner*—Forester W. Isen
*Assistant Examiner*—Jacques M. Saint-Surin

[57] ABSTRACT

A method and apparatus for cancelling acoustic echoes that enhances the hands free operation of audio/video conferencing equipment, wireless and cellular telephones, internet and intranet telephones, etc. is disclosed. The method and apparatus use a constrained and orthogonalized, frequency domain, block, least mean square adaptive filter to generate an estimate of an acoustic echo signal. The estimate of the acoustic echo signal is subtracted from a near end microphone signal to provide an echo reduced communication signal. The echo reduced communication signal is then either transmitted or processed further. The further processing can include non-linear processing using an adaptive speech filter. The method and apparatus include a novel method for updating the coefficients of an adaptive filter.

23 Claims, 3 Drawing Sheets

ACOUSTIC ECHO CANCELLER

FIELD OF THE INVENTION

The present invention relates to methods and devices for cancelling acoustic echoes, especially those that utilize frequency domain adaptive filtering and block processing.

BACKGROUND OF THE INVENTION

Acoustic echo is a major problem in communication devices designed in such a way that a near end microphone is exposed to a loudspeaker driven by a far end signal. When the near end microphone picks up the far end loudspeaker signal, the communication device retransmits the signal to its original source. This causes far end users to hear a delayed version of their speech referred to as acoustic echo.

One way of avoiding acoustic echo is to operate the communication device in half duplex mode. In half duplex mode, communication signals only proceed in one direction at a time. This prevents acoustic echo, but it causes degradation in an interactive conversation.

Another way of preventing acoustic echo is to use an echo canceller. Echo cancellers allow communication devices to operate in full duplex mode which provides the maximum interactive conversation.

In general, an echo canceller is an adaptive filter that models the electroacoustical response of a near end microphone when a far end loudspeaker signal is received as input. The modeled response of the near end microphone is then subtracted from an outgoing communication signal to yield an echo reduced communication signal. During operation of the echo canceller, the coefficients of the adaptive filter are adapted so the filter can converge on an accurate estimate of the echo signal.

One example of an echo canceller is described in U.S. Pat. No. 5,305,307 entitled "Adaptive Acoustic Echo Canceller Having Means for Reducing or Eliminating Echo in a Plurality of Signal Bandwidths" issued to Chu. Another example of an echo canceller is described in U.S. Pat. No. 5,526,426 entitled "System and Method for an Efficiently Constrained Frequency Domain Adaptive Filter" issued to McLaughlin.

Despite the numerous advances that have been made in echo cancellers, conventional devices still have limitations. For example, conventional echo cancellers exhibit less than optimal echo reduction after converging to their peak performance levels.

SUMMARY OF THE INVENTION

The present invention is a method and apparatus for cancelling acoustic echoes that enhances the hands free operation of audio/video conferencing equipment, wireless and cellular telephones, internet and intranet telephones, etc. The invention uses a constrained and orthogonalized, frequency domain, block, least mean square adaptive filter to generate an estimate of an acoustic echo signal. The estimate of the acoustic echo signal is subtracted from a near end microphone signal to provide an echo reduced communication signal. The echo reduced communication signal is then either transmitted or processed further. The further processing can include non-linear processing using an adaptive speech filter. The invention includes a novel method for updating the coefficients of an adaptive filter.

It is an object of the invention to provide an acoustic echo canceller that requires fewer MIPS (Millions of Instructions per Second) than conventional echo cancellers.

It is another object of the invention to exhibit optimal echo reduction after converging to peak performance.

It is yet another object of the invention to provide an improved method for adapting the coefficients of an adaptive filter.

DESCRIPTION OF THE DRAWINGS

Other objects and advantages of the invention will become apparent from the following description and accompanying drawings in which.

DESCRIPTION OF THE INVENTION

Figure 1:
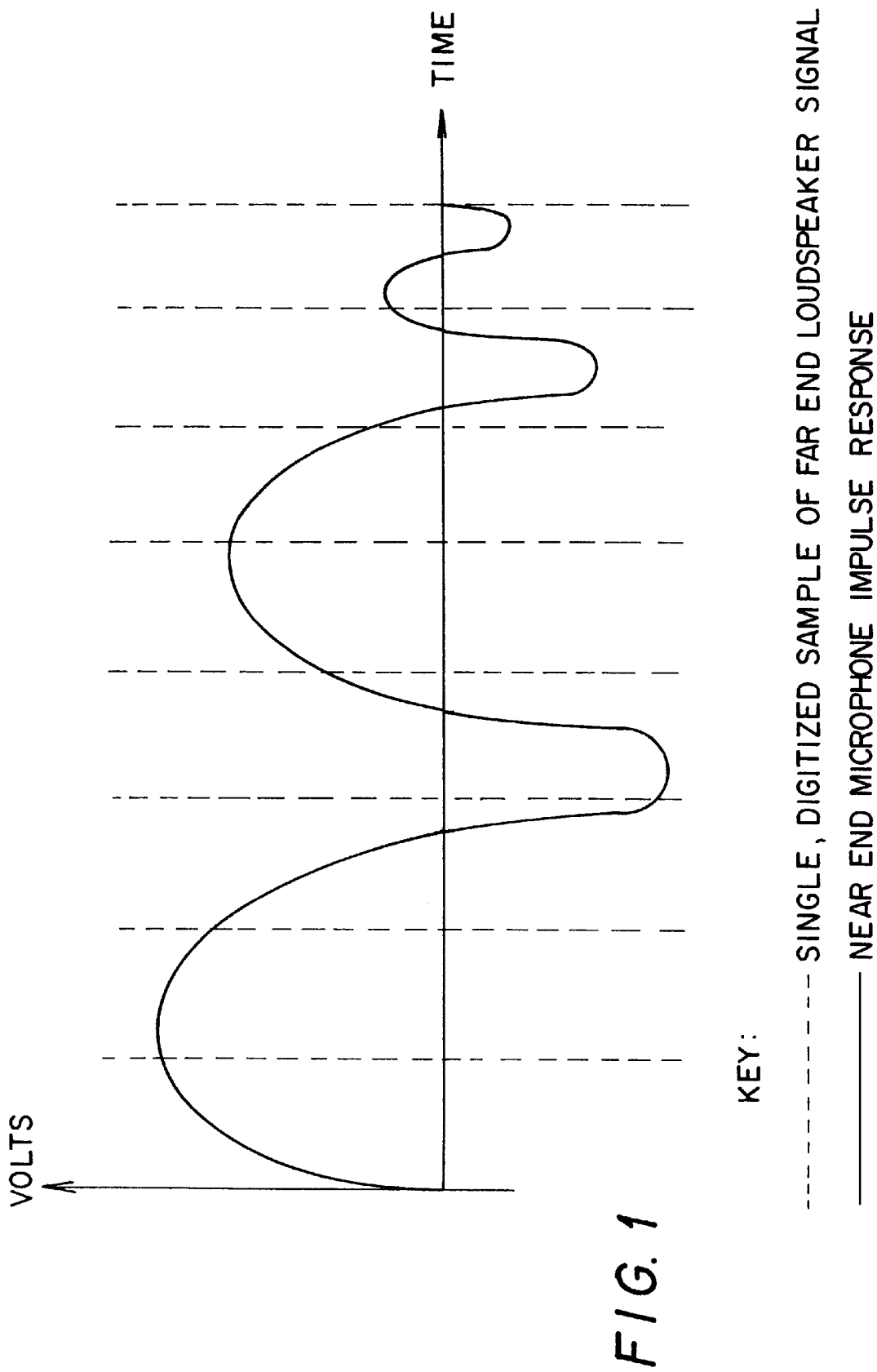
FIG. 1 shows a typical near end microphone impulse response to a single, digitized sample of far end loudspeaker signal.

When a near end microphone picks up a single, digitized sample of far end loudspeaker signal, the near end microphone exhibits a response similar to that shown in FIG. 1. This response is called the impulse response. The echo canceller of the present invention divides the impulse response into different time frames, models the response for each time frame independently, and then subtracts the convolution of the modeled impulse response and the far end loudspeaker signal from the near end microphone signal.

Figure 2:
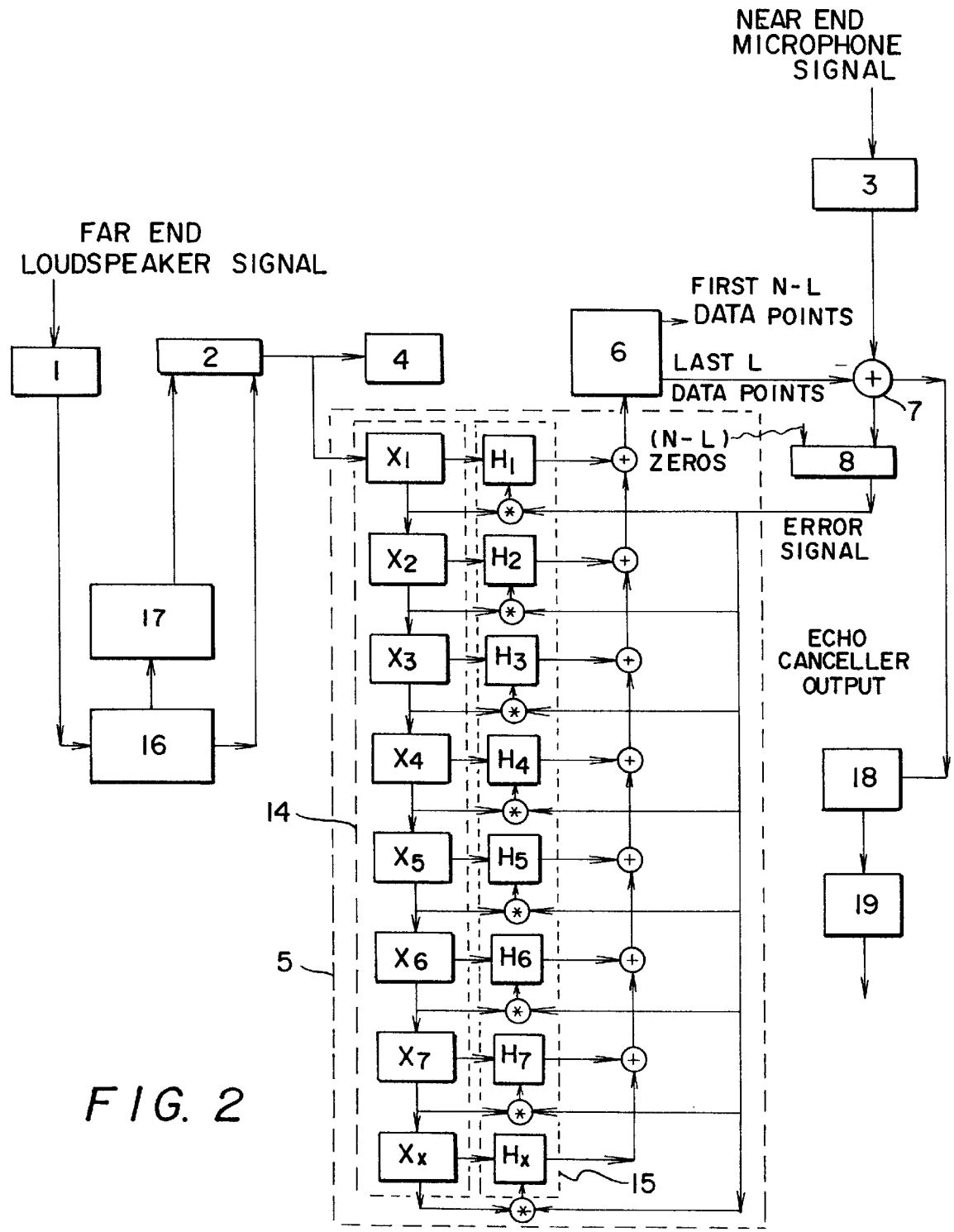
FIG. 2 is an embodiment of the acoustic echo canceller of the present invention where N=128, L=N/2, and Q=0.

FIG. 2 shows one embodiment of the acoustic echo canceller of the present invention. Every embodiment of the present invention, has two variable parameters, N and L. N is the size of the transforming means utilized in the invention, and L is the number of samples that will be grouped into blocks for processing. A third parameter, Q, is determined by N and L. Q equals N−(L·truncate__fraction (N/L)). In the embodiment shown in FIG. 2, N=128, L=N/2, and Q=0.

As shown in FIG. 2, a time domain, analog, near end microphone signal containing near end speech and acoustic echo is fed to a sampler 3. The sampler 3 gathers the near end microphone signal into blocks containing L digitized samples.

A time domain, analog, far end loudspeaker signal is fed to a sampler 1. The sampler 1 gathers the far end loudspeaker signal into blocks containing L digitized samples. The blocks of the far end loudspeaker signal are stored in a plurality of collectors 16 and 17.

In certain applications, sampler 1 and/or sampler 2 will not receive an analog signal. Instead, the echo canceller will receive either a digitized far end loudspeaker signal, a digitized near end microphone signal, or both. In these cases, the sampler(s) will only have to collect the digitized signal into blocks containing L samples; not digitize the signal.

Initially, the collectors 16 and 17 are filled with zeros. During the first iteration, the first block of far end loudspeaker signal is fed to the collector 16. The next iteration, the block that was previously in collector 16 is fed to collector 17, and collector 16 receives the most recent block of samples. Every successive iteration, the most recent block of far end loudspeaker signal is fed to collector 16, and the block previously in collector 16 is fed to collector 17.

The echo canceller shown in FIG. 2 has two collectors 16 and 17 because N=128, L=N/2, and Q=0. Other embodiments of the invention will not have two collectors. The number of collectors included in an embodiment of the present invention is determined by the following equation:

$$\text{number of collectors} = \frac{(N-Q)}{L}$$

where
N=block size of the transforming means;
L=number of samples grouped into blocks for processing; and
Q=N−(L·truncate_fraction (N/L))

Every iteration, the information stored in the collectors 16 and 17 is concatenated to form an (N−Q) sample real vector. Q zeros are then added to the front of the (N−Q) sample real vector to yield a time domain, N sample real vector representing the far end loudspeaker signal. The time domain, N sample real vector is then transformed into a frequency domain, complex vector $X_k$ via a transforming means 2.

A gap detector 4 receives the frequency domain, complex vector representation of the far end loudspeaker signal $X_k$ from the transforming means 2. The gap detector 4 monitors $X_k$ for gaps. In a preferred embodiment of the present invention, the gap detector 4 detects a gap if:

power $\leq (N/4)$normin 2^[too_quiet shift]

where
power=power of the far end loudspeaker signal;
N=block size of the transforming means;
normin=minimum speaker power estimate in a frequency bin; and
too_quiet_shift =variable that determines the gap detector's total power threshold.

In another preferred embodiment of the present invention, the gap detector 4 detects a gap if the time averaged power is less than a specified amount for G iterations. The time averaged power is calculated by low pass filtering.

Although the gap detector 4 receives a frequency domain, complex vector representation of the far end loudspeaker signal $X_k$ in the embodiment of the invention shown in FIG. 2, the gap detector can just as easily analyze a time domain signal. Consequently, in other embodiments, the gap detector can receive signals from the sampler 1 or from the collectors 16 and 17.

An adaptive filter 5 designed to model the impulse response from the near end loudspeaker to the near end microphone also receives the frequency domain, complex vector representation of the far end loudspeaker signal $X_k$ from the transforming means 2. The adaptive filter 5 includes M memory sites 14 for storing successive frequency domain, complex vectors $X_k$. The number of memory sites 14 in an embodiment of the present invention is determined by the following equation:

$$M = \frac{\text{span} - N + Q}{L} + 2$$

where
span=number of samples in the impulse response model;
N=block size of the transforming means;
L=number of samples grouped into blocks for processing; and
Q=N−(L·truncate_fraction (N/L))

The adaptive filter 5 also includes m memory sites 15 for storing frequency domain adaptive filter coefficient vectors $H_k$. Each $H_k$ is a complex vector whose elements correspond to different frequency bins. In a preferred embodiment of the present invention, there are 65 different frequency bins. The different coefficient vectors $H_k$ represent frequency domain estimates of the impulse response for different time intervals.

The number of memory sites 15 for storing frequency domain adaptive filter coefficient vectors $H_k$ in an embodiment of the present invention is determined by the following equation:

$$m = \frac{\text{span}}{(N-L-Q)}$$

Memory site 14 and 15 contain the most recent information collected. Every iteration, a new frequency domain, complex vector $X_k$ and an adapted coefficient vector $H_k$ occupy the memory sites reserved for $X_1$ and $H_1$. The previous complex vectors $X_k$ slide down one memory site 14, and the previous coefficient vectors $H_k$ are adapted.

The adaptive filter 5 generates a frequency domain estimate of the acoustic echo signal using the information stored in memory sites 14 and 15. In the frequency domain, the estimate of the acoustic echo signal is equal to the sum of the frequency domain, complex vectors $X_k$ multiplied by the frequency domain, adaptive filter coefficient vectors $H_k$.

A preferred embodiment of the invention does not use every frequency domain, complex vector $X_k$ stored in memory site 14 to calculate the estimate of the acoustic echo signal. Instead, only every $S^{th}$ frequency domain, complex vector $X_k$ is used. S, called the far end loudspeaker block skip index, is calculated according to the following equation:

$$S = \frac{(N-L-Q)}{L}$$

Using every $S^{th}$ frequency domain, complex vector $X_k$, the frequency domain estimate of the acoustic echo signal can be calculated according to the following equation:

$$P = [H_1 \cdot X_1 + H_2 \cdot X_{1+s} \ldots + H_m \cdot X_M]$$

where
P=estimate of the acoustic echo;
$H_k$=adaptive filter coefficient vector; and
$X_n$=frequency domain, complex vector representation of the far end loudspeaker signal.

An inverse transforming means 6 receives the frequency domain estimate of the acoustic echo signal from the adaptive filter 5 and transforms it into the tine domain. A block consisting of the last L samples of the time domain estimate of the acoustic echo signal is then fed to a subtractor 7.

The subtractor 7 also receives a block of the time domain, near end microphone signal from the sampler 3. The subtractor 7 subtracts the block, time domain estimate of the acoustic echo signal from the block, time domain, near end microphone signal to provide a time domain, echo reduced communication signal. The echo reduced communication signal is then either transmitted or processed further.

In order for the adaptive filter 5 to converge on an accurate estimate of the acoustic echo signal, the frequency domain adaptive filter coefficient vectors $H_k$ must be adapted. The coefficient vectors $H_k$ are adapted every iteration unless the gap detector 4 detects a gap in the frequency domain, complex vector $X_k$. While a gap is detected, the adaptation of the coefficient vectors $H_k$ is discontinued.

In a preferred embodiment of the present invention, the adaptation of the frequency domain adaptive filter coefficient vectors $H_k$ requires 2 steps per iteration. First, a normalized Least Mean Square (LMS) update is calculated for each frequency domain adaptive filter coefficient vector $H_k$. Second, at least one of the coefficient vectors $H_k$ is constrained.

The LMS update is calculated using the "self orthogonalized" method of normalization. Under the self orthogonalized method, an adaptive filter coefficient vector $H_k$ is updated by an amount equal to the product of the complex conjugated far end loudspeaker signal and a normalization factor multiplied by an error signal. The following equation is used to calculate the updated frequency domain adaptive filter coefficient vector $H_k$:

$$H_k = H_{k+} 2^{-NBFP}(mu0/span/NORM)(X_{n+1-ks}{}^* \cdot E)$$

where
mu0=scaling factor for the LMS update;
span=m·(N−L−Q);
NORM=normin·c (at startup);
NORM=max [normin·c, $(1-\beta)$norm+$\beta(X_n \cdot X_n{}^*)$](after startup)

where c is an (N/2+1) length vector with all elements equal to 1;

normin is a fixed scalar quantity; and $\beta = 2\wedge$[beta_shift]=average speaker power if a gap is not detected; else $\beta = 2\wedge[-15]$ $X_{n+1-ks}$=frequency domain representation of the far end loudspeaker signal; and E=frequency domain representation of the error signal.

In a preferred embodiment of the present invention, the error signal E is a modified version of the echo reduced communication signal. As shown in FIG. 2, the error signal is obtained by setting the first (N−L) coefficients of the error signal equal to zero and filling the last L coefficients of the error signal with the L real samples of the time domain, echo reduced communication signal. The resulting time domain error signal is then transformed into the frequency domain via a transforming means 8.

Figure 3:
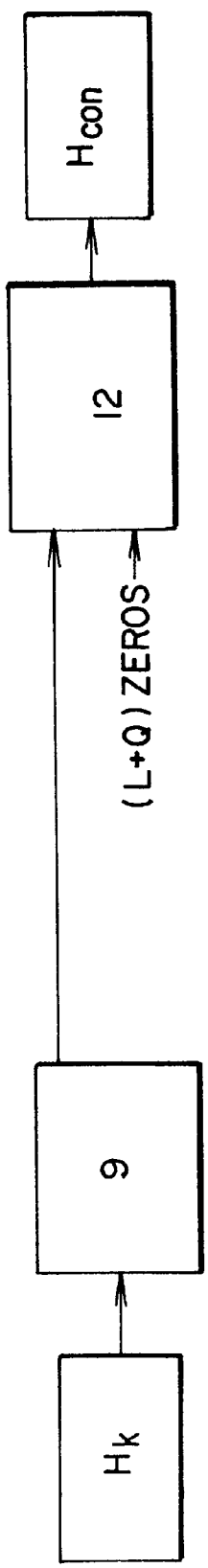
FIG. 3 shows the constraint utilized in the present invention.

After the coefficient vectors $H_k$ have been updated, a constraint is applied to at least one of them. As shown in FIG. 3, the frequency domain adaptive filter coefficient vector $H_k$ that will be constrained is fed to an inverse transforming means 9 which transforms it from the frequency domain into the time domain. Next (L+Q) zeros are added to the end of the first (N−L−Q) samples of the inverse transform of $H_k$ in a transforming means 12. The transforming means 12 transforms the constrained coefficient $H_{con}$ from the time domain information into the frequency domain. The constrained coefficient $H_{con}$ is then stored in the appropriate memory site 15. The following equation defines the constrained coefficient $H_{con}$:

$$H_{con} = FFT\{T[1, N-L-Q, FFT\{[H_{con}z(H_{con})]^*\}], z_3, z_4\}$$

where
T=[i, j, $(a_1, a_2, \ldots a_{i-1}, a_i, a_{i+1}, \ldots a_{j-1}, a_j, a_{j+1}, \ldots a_N)$]=$(a_i, a_{i+1}, \ldots a_j)$;
$z(y) = (y_{N/2}, y^{N/2-1}, \ldots y_2)^* \in C^{N/2-1}$ where $y=(y_1, y_2, y_3, \ldots y_{N/2+1}) \in C^{N/2+1}$;
$z_3 \in R^L = 0$; and
$z_4 \in R^Q = 0$.

Every iteration, the constraint is applied to a subsequent frequency domain adaptive filter coefficient vector $H_k$ until it reaches the last frequency domain adaptive filter coefficient vector $H_m$. After the constraint is applied to $H_m$, it returns to the first coefficient vector $H_l$. The "rotating" constraint used in the present invention provides the optimal balance between performance and MIPS consumption.

In another preferred embodiment of the present invention, the adaptation of the coefficient vectors $H_k$ is carried out as follows. First, every iteration, an LMS update is calculated for the frequency domain adaptive filter coefficient vectors $H_k$ as described above. Second, every other iteration, at least one of the coefficient vectors $H_k$ is constrained.

In a preferred embodiment of the present invention, the echo reduced communication signal s(t) is not transmitted after it leaves the adaptive filter 5. Instead, the echo reduced communication signal s(t) is processed further. As shown in FIG. 1, the further processing can comprise an adaptive speech filter 18 and/or a center clipper 19.

Using an adaptive speech filter to process the signal exiting the acoustic echo canceller of the present invention enhances the outgoing signal in several ways. First, the adaptive speech filter eliminates acoustical and electronic noise from the outgoing communication signal. Second, it reduces low level white noise that is sometimes generated by the echo canceller when it stochastically varies the coefficients of the adaptive digital filter. Third, the adaptive speech filter acts as a conventional non-linear processor to reduce residual echo.

The adaptive speech filter 18 can be a Noise Cancellation Technologies, Inc. (NCT) Adaptive Speech Filter. NCT's Adaptive Speech Filter is described in U.S. Pat. No. 5,768,473 which is hereby incorporated by reference.

The echo canceller of the present invention can be configured in a variety of different embodiments. Certain embodiments are best suited for specific applications. For example, in telephony applications, the echo canceller should include an analog filter to remove signals outside of the 0.3 kHz to 3.4 kHz from the near end microphone signal.

It should be understood that every aspect of the present invention has not been described explicitly. Thus, certain modifications of the present invention that are not explicitly described are fully comprehended by the spirit of the present invention and the scope of the following claims. Also, those skilled in the pertinent art recognize that all of the above described capabilities can be carried out by a variety of hardware configurations.

What is claimed is:

1. An echo canceller, comprising:

a first sampler that receives a time domain, far end loudspeaker signal and gathers the far end loudspeaker signal into blocks containing L samples, L is a variable parameter that determines the number of samples grouped into blocks for processing;

a second sampler that receives a time domain, near end microphone signal and gathers the near end microphone signal into blocks containing L samples, L is a variable parameter that determines the number of samples grouped into blocks for processing;

a plurality of collectors for receiving successive blocks of the far end loudspeaker signal from said first sampler;

first transforming means for transforming a time domain, N sample vector representing the far end loudspeaker signal formed by concatenating successive blocks of the far end loudspeaker signal received from said plurality of collectors to yield a (N−Q) sample vector and then adding Q zeros to the front of the (N−Q) vector into the frequency domain, N is the block size of the transforming means and Q equals N−(L·truncate__ fraction (N/L));

a gap detector that receives the frequency domain, complex vector representation of the far end loudspeaker signal from said first transforming means and monitors the complex vector representation for gaps;

an adaptive filter that receives the frequency domain, complex vector representation of the far end loudspeaker signal from said first transforming means and uses multiple complex vectors to generate a frequency domain estimate of an acoustic echo signal, the adaptive filter coefficients are adapted every iteration unless the gap detector detects a gap in the complex vector representation;

second transforming means for transforming the last L samples of the frequency domain estimate of the acoustic echo signal received from said adaptive filter into the time domain; and a subtractor that receives both the last L samples of the time domain estimate of the acoustic echo signal from said second transforming means and the time domain, near end microphone signal from said second sampler, said subtractor subtracts the estimate of the acoustic echo signal from the near end microphone signal to yield an echo reduced communication signal.

2. An echo canceller according to claim 1 wherein said gap detector receives the time domain, far end loudspeaker signal from said plurality of collectors and monitors the signal for gaps.

3. An echo canceller according to claim 1 wherein said gap detector receives the time domain, far end loudspeaker signal from said first sampler and monitors the signal for gaps.

4. An echo canceller according to claim 1 further comprising an adaptive speech filter that receives the echo reduced communication signal from said subtractor means and reduces the noise content of the echo reduced communication signal.

5. An echo canceller according to claim 4 further comprising a center clipper that receives the signal from the adaptive speech filter and removes residual noise.

6. An echo canceller according to claim 1 wherein said gap detector detects a gap in the frequency domain, complex vector representation of the far end loudspeaker signal if:

$$\text{power} \leq (N/4)\text{normin } 2\wedge[\text{too\_quiet\_shift}]$$

where power is power of the far end loudspeaker signal,

N is the block size of the transforming means, normin is the minimum speaker power estimate in a frequency bin, and too_quiet_shift is a variable that determines the gap detector's total power threshold.

7. An echo canceller according to claim 6 where too_quiet_shift=2.

8. An echo canceller according to claim 1 wherein said gap detector detects a gap in the frequency domain, complex vector re presentation of the far end loudspeaker signal if the time averaged power is less than a specified amount for G iterations, G is a variable parameter.

9. An echo canceller according to claim 1 wherein said adaptive filter generates an estimate of the acoustic echo signal by summing the product of every $S^{th}$ frequency domain, complex vector representation of the far end loudspeaker signal and corresponding frequency domain, adaptive filter coefficient vector, S equals (N-L-Q)/L.

10. An echo canceller according to claim 1 wherein said first sampler gathers the far end loudspeaker signal into blocks with (N-L-Q)/(N-Q) overlap.

11. An echo canceller according to claim 1 wherein said second sampler gathers the near end microphone signal into blocks with zero overlap.

12. An echo canceller according to claim 1 where $0 \leq L \leq N/2$.

13. An echo canceller according to claim 1 where the adaptation of the adaptive filter coefficients requires an update of the adaptive filter coefficient vectors to be calculated and at least one of the adaptive filter coefficient vectors to be constrained every iteration.

14. An echo canceller according to claim 13 where the adaptive filter coefficient that is constrained $H_{con}$ is defined by the following equation:

$$H_{con}FFT\{T[1, N-L-Q, (FFT\{[H_{con}, z(H_{con})]^*\})], z_3, z_4\}$$

where $T=[i, j, (a_1, a_2, \ldots a_{i-1}, a_i, a_{i+1} \ldots a_{j-1}, a_j, a_{j+1}, \ldots a_N)]=(a_i, a_{i+1}, \ldots a_j)$, $z(y)=(y_{N/2}, y_{N/2-1}, \ldots y_2)^* \in C^{N/2-1}$ where $y=(y_1, y_2, y_3, \ldots y_{N/2+1}) \in C^{N/2+1}$, $z_3 \in R^L = 0$, and $z_4 \in R^Q = 0$.

15. An echo canceller according to claim 13 where the update for the adaptive filter coefficient vectors is calculated according to the following equation:

$$H_k = H_k + 2^{-NBFP}(mu0/span/NORM)(X_{n+1-ks}^* \cdot E)$$

where mu0 is a scaling factor for the LMS update, span is the number of samples in the impulse response model, NORM equals normin·c (at startup), NORM equals max [normin·c, $(1-\beta)$norm$+\beta(X_n \cdot X_n^*)$] (after startup), c is an (N/2+1) length vector with all elements equal to 1, normin is a fixed scalar quantity, $\beta = 2\wedge[\text{beta\_shift}]$=average speaker power if a gap is not detected, else $\beta = 2\wedge[-15]$, $X_{n+1-ks}$ is the frequency domain representation of the far end loudspeaker signal, and E is the frequency domain representation of the error signal.

16. An echo canceller according to claim 15 wherein the error signal, E, is a modified echo reduced communication signal.

17. An echo canceller according to claim 1 where the adaptation of the adaptive filter coefficients requires an update of the adaptive filter coefficient vectors to be calculated every iteration and at least one of the adaptive filter coefficient vectors to be constrained at le a st every other iteration.

18. An echo canceller according to claim I wherein the time domain, far end loudspeaker and the time domain, near end microphone signal originate from an audio/video conferencing device, a wireless or cellular telephone, or an internet or intranet telephone.

19. A method for cancelling acoustic echo comprising the steps of:

sampling a time domain, far end loudspeaker signal;

sampling a time domain, near end microphone signal;

gathering the time domain, far end loudspeaker signal into blocks containing L samples, L is a variable parameter that determines the number of samples grouped into blocks for processing;

gathering the time domain, near end microphone signal into blocks containing L samples, L is a variable parameter that determines the number of samples grouped into blocks for processing;

concatenating successive blocks of the time domain, far end loudspeaker signal to create a time domain (N−Q) sample vector, N is the block size of the transforming means and Q equals N−(L·truncate_fraction (N/L));

adding Q zeros to the front of the time domain (N−Q) sample vector to yield a time domain, N sample vector representing the far end loudspeaker signal;

transforming the time domain, N sample vector representing the far end loudspeaker signal into the frequency domain;

monitoring the frequency domain, complex vector representation of the far end loudspeaker signal for gaps;

filtering adaptively the frequency domain, complex vector representation of the far end loudspeaker signal to generate a frequency domain estimate of the acoustic echo signal;

transforming the last L samples of the frequency domain estimate of the acoustic echo signal into the time domain;

subtracting the last L samples of the time domain acoustic echo signal from the time domain, near end microphone signal to yield an echo reduced communication signal; and adapting the characteristics of the filtering unless a gap is detected in the frequency domain, complex vector representation of the far end loudspeaker signal.

20. A method for cancelling acoustic echo according to claim 19 further comprising the step of processing the echo reduced communication signal with an adaptive speech filter to reduce the noise content of the echo reduced communication signal.

21. A method for cancelling acoustic echo according to claim 20 further comprising the step of processing the signal leaving the adaptive speech filter with a center clipper to remove residual noise.

22. A method for cancelling acoustic echo according to claim 19 wherein the time domain, far end loud speaker and the time domain, near end microphone signal originate from an audio/video conferencing device, a wireless or cellular telephone, or an internet or intranet telephone.

23. A method for cancelling acoustic echo comprising the steps of:

sampling a time domain, far end loudspeaker signal;

sampling a time domain, near end microphone signal;

monitoring the time domain, far end loudspeaker signal for gaps;

gathering the time domain, far end loudspeaker signal into blocks containing L samples, L is a variable parameter that determines the number of samples grouped into blocks for processing;

gathering the time domain, near end microphone signal into blocks containing L samples, L is a variable parameter that determines the number of samples grouped into blocks for processing;

concatenating successive blocks of the time domain, far end loudspeaker signal to create a time domain (N−Q) sample vector, N is the block size of the transforming means and Q equals N−(L·truncate_fraction (N/L));

adding Q zeros to the front of the time domain (N−Q) sample vector to yield a time domain, N sample vector representing the far end loudspeaker signal;

transforming the time domain, N sample vector representing the far end loudspeaker signal into the frequency domain;

filtering adaptively the frequency domain, complex vector representation of the far end loudspeaker signal to generate a frequency domain estimate of the acoustic echo signal;

transforming the last L samples of the frequency domain estimate of the acoustic echo signal into the time domain;

subtracting the last L samples of the time domain acoustic echo signal from the time domain, near end microphone signal to yield an echo reduced communication signal; and adapting the characteristics of the filtering unless a gap is detected in the frequency domain, complex vector representation of the far end loudspeaker signal.

* * * * *